Feb. 13, 1923.
P. L. MANLET.
AUTO STEERING WHEEL LOCK.
FILED MAY 22, 1920.
1,444,977.
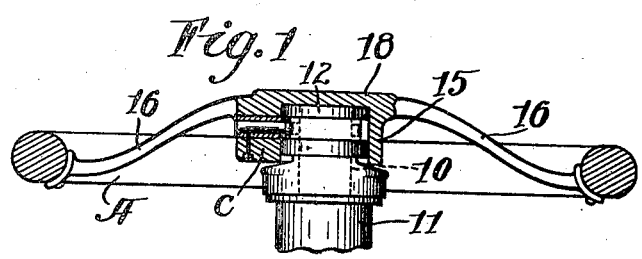
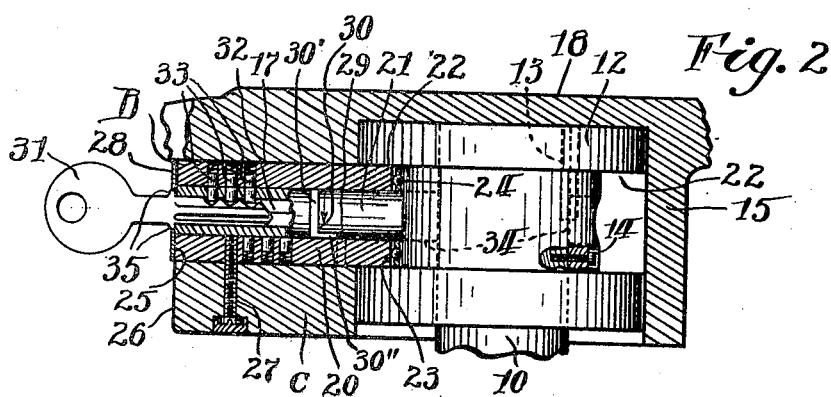
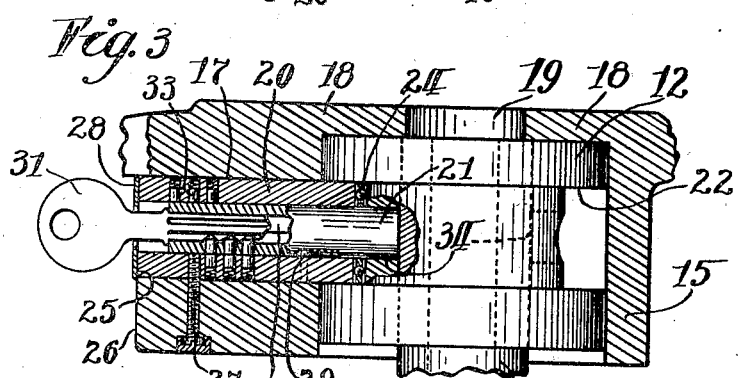
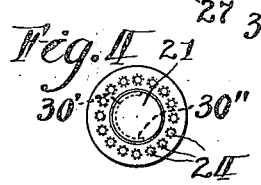
Inventor:
Peter L. Manlet
by: *Hmautfisch*
Attorney.

Patented Feb. 13, 1923.

1,444,977

UNITED STATES PATENT OFFICE.

PETER L. MANLET, OF ST. PAUL, MINNESOTA, ASSIGNOR OF ONE-FOURTH TO EDWARD G. KRAHMER, OF ST. PAUL, MINNESOTA.

AUTO STEERING-WHEEL LOCK.

Application filed May 22, 1920. Serial No. 383,356.

*To all whom it may concern:*

Be it known that I, PETER L. MANLET, a citizen of the United States, residing at St. Paul, in the county of Ramsey and State of Minnesota, have invented a new and useful Improvement in Auto Steering-Wheel Locks, of which the following is a specification.

My invention relates to locking means carried by and forming a part of the steering wheel, its object being to render the steering gear of an automobile inoperative to all but authorized persons.

A feature of my invention is to provide a simple means whereby the steering wheel, when attached to a shaft of the steering gear of a vehicle, may be freely rotated without operating the steering mechanism, and also provides a locking arrangement which may be brought into engagement with the steering shaft to cause the steering shaft to operate when the steering wheel is turned.

A further object of my invention is to provide means whereby the steering wheel can not easily be removed from the steering shaft unless one is familiar with the location of certain countersunk set screws, said countersunk screws being covered over with suitable material and painted to correspond with the rest of the steering wheel.

In the drawings forming part of this specification:

Figure 1 is a fragmentary view of my steering wheel lock partly in section.

Figure 2 is an enlarged view partly in section of the locking mechanism, illustrating the steering wheel in inoperative position.

Figure 3 is an enlarged view partly in section, illustrating an alternative form of my steering wheel in operative position.

Figure 4 is an inner end view of the lock bolt and thrust bearing.

The drawings illustrate my steering wheel A attached to the head of a steering shaft 10 of an ordinary motor vehicle, only a portion of the shaft and its tubular housing 11 being illustrated.

My steering wheel A is of very simple construction and conforms in practically every detail, with the exception of the locking mechanism, to the well-known steering wheels now commonly in use and can be attached to a steering post or connecting parts without making any changes thereon. In attaching the wheel A to the shaft 10, a hub 12 is first slipped onto the shaft and is secured thereto by means of the key 13 and the countersunk set screw 14.

The locking mechanism B is located in an enlarged central portion C of the steering wheel A. This portion or lock casing C forms a part of the hub 15 and is positioned between any two of the spokes 16 of the wheel A. The locking mechanism is disassociated from the casing C until the wheel A has been placed on the hub 12, at which time the lock cylinder and bolt are inserted into the lateral cylindrical opening 17 in the casing C.

The steering wheel A may be formed with its central portion 18 solid, that is, so that the hub 12 and steering shaft 10 are concealed from view, as illustrated in Figures 1 and 2, or it may be formed with an opening 19, to allow the operating levers of the motor vehicle to extend therethrough.

The locking mechanism B consists of the casing C, cylinder 20 and lock bolt 21. The cylinder 20 containing the bolt 21 is inserted into the cylindrical opening 17 and is adapted to engage the annular groove 22 of the hub 12. The cylinder 20 is of such length that its forward end 23 engages the thrust ball bearings 24, which contact with the hub 12, while its rear end 25 is flush with the edge 26 of the casing C. The thrust ball bearings 24 allow the steering wheel A to rotate easily when it is in inoperative position. The cylinder 20 is held against lateral disengagement from the opening 17 by a countersunk set screw 27, the head of said set screw being further concealed by a covering of suitable material. This avoids the possibility of an unauthorized person removing the steering wheel A from the shaft 10, as the front end 23 of the cylinder engages the annular groove 22 of the hub 12 and keeps the steering wheel securely attached thereto. The lock bolt 21 is kept from lateral disengagement from the cylinder 20 by the circular band 28 and stop pin 29. This stop pin 29 also acts as a guide for the movement of the bolt 21 in its locking and unlocking position, the stop pin engaging in the groove 30 to guide and direct the movement of the bolt 21.

The groove 30 is formed in the outer surface of the bolt 21, having a semi-circular, peripheral portion 30′ extending transversely of the bolt and a portion 30″ extending longitudinally of the bolt. This groove 30 allows the bolt, when unlocked, to be moved inward in a longitudinal direction and then rotated half a turn to lock the bolt in its inward position.

The operation of the lock bolt 21 is effected by inserting the key 31 in the slot 32. As the key is being inserted the locking tumbler pins 33 are raised in the usual manner to permit the bolt 21 to be pushed forward to engage one of the openings 34 in the hub 12. This is accomplished in the following manner: The key 31 is pushed into the slot 32 until the shoulders 35 engage the end of the bolt 21. By this time the tumbler locking pins have been raised, and by applying inward pressure to the key 31 and rotating the wheel A so as to bring the bolt into a position to correspond with one of the openings 34 in the hub 12, the bolt 21 will slide into the opening. The groove 30 allows the bolt 21 to move inward until it has reached the limit of its forward movement when it is ready to be locked in this position, by rotating the bolt through the medium of the key 31 to the right, as indicated by the arrow along the portion 30' of the groove 30, Fig. 2, and the locking mechanism assumes the position as illustrated in Figure 3. In this manner the steering wheel A is locked with the steering shaft 10 and is in position to operate the steering mechanism of the vehicle. The key 31 can now be withdrawn if it is so desired.

When it is desired to cause the steering mechanism to become inoperative the key 31 is inserted in the slot 32, turned to the left a half turn and pulled outward as if to disengage it therefrom. This operation pulls the bolt 21 out of the opening 34 far enough for its rear end to strike the band 28 and for the end of the groove 30 to engage the stop pin 29. The key may now be withdrawn and the steering wheel A is then free to rotate but without operating the steering mechanism of the vehicle.

My device is of an extremely simple, inexpensive construction, the parts of which are designed in a manner to be most effective. The locking mechanism of my device is operable so that the bolt of the lock forms a direct engagement to rigidly connect the steering wheel and the operating shaft directly together. This construction simplifies to a great degree the device, eliminating any unneccessary parts. One position of the operating key 31 unlocks the steering wheel A from the operating or steering shaft 10, as illustrated in Figure 2, while the other position of the key causes the bolt 21 of the locking mechanism B to engage one of the recesses 34 to rigidly connect the steering wheel with the steering shaft in readiness to operate the steering mechanism of a vehicle. The locking mechanism B is operated in a simple manner by the key 31 to set the bolt 21 into locking or unlocking position, while the bolt proper of the locking mechanism forms the key or medium between the steering wheel and the steering shaft to lock the two members together to operate the steering mechanism of the vehicle.

The construction of my device is illustrated as attached and operating in connection with the steering wheel A, but I desire to have it understood that this construction is only illustrative and that the invention can be carried out and adapted to other means where a key operated locking mechanism is desired to lock or unlock two members in a simple and effective manner.

In accordance with the Patent Statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. In combination with a steering wheel post and steering wheel of an automobile, a cylinder lock mounted on said steering wheel comprising a cylinder, a bolt positioned within said cylinder and adapted to be slid longitudinally therein, a series of pin tumblers positioned in said cylinder on one side thereof, and a second set of pin tumblers positioned on the other side of said first pin tumblers diametrically opposite the same in advance along said cylinder relative to the first pin tumblers, a single set of latching apertures formed in said bolt adapted to cooperate with the pins of either of said sets of tumblers to hold the bolt in an advanced to retired position.

2. In combination with a steering post and steering wheel of an automobile, a cylinder lock mounted on said steering wheel comprising a cylinder, a bolt positioned within said cylinder and adapted to be slid longitudinally therein, means on said post to engage the end of said bolt when the same is slid inwardly, a set of tumblers positioned within said cylinders and adapted to engage said bolt when the same is in its locking position to hold the same from movement relative to the cylinder, a second set of tumblers in said cylinder adapted to engage said bolt to hold the same from movement when the same is in its unlocking position, a longitudinal guideway formed on said bolt, a member secured to said cylinder engaging said guide-way for holding the bolt when in its unlocked position from rotation until the same has been moved to its locking position, and a peripherial guide-way formed on the bolt cooperating with the longitudinal guide-way for holding the bolt when in locking position from longitudinal movement prior to the engagement of the tumblers therewith.

3. In combination with a steering post of an automobile, a hub secured to said steering post having a pair of flanges forming an annular groove therein, a hub cap mounted over said hub, a cylinder lock secured in said hub cap comprising a cylinder having its end projecting inwardly beyond the hub cap to engage in between the two flanges of said cap, a bolt slidable within said cylinder lock means for controlling said bolt, and means on said hub adapted to engage said bolt for locking the hub cap upon the steering wheel post.

4. In combination with a steering post of an automobile, a hub secured to said steering post having a pair of flanges forming an annular groove therein, a hub cap mounted over said hub, a cylinder lock secured in said hub cap comprising a cylinder having its end projecting inwardly beyond the hub cap to engage in between the two flanges of said cap, a bolt slidable within said cylinder lock means for controlling said bolt, and means on said hub adapted to engage said bolt for locking the hub cap upon the steering wheel post, and an end thrust ball bearing positioned between the end of said lock cylinder and the said hub.

5. A steering wheel lock in combination with a hand operated wheel and steering shaft, a cylinder lock carried by said wheel, a key receiving bolt within said lock, having a longitudinal slot formed in the outer surface of said bolt closed at one end, and a transversely extending peripheral slot connecting with said longitudinal slot at its other end, a stop pin adapted to engage in said slot and key operated locking plungers adapted to engage said bolt to hold the same out of operating position or in operating position, said plungers being released by the operating key to release said bolt to allow it to move in a longitudinal direction inwardly the length of said longitudinal slot formed therein and to be rotated through the medium of said peripheral slot while said last mentioned slot forms a shoulder to hold said bolt against longitudinal movement while the operating key is withdrawn therefrom, said locking plungers being adapted to lock said bolt in inner position.

PETER L. MANLET.